No. 843,246. PATENTED FEB. 5, 1907.
C. WENDLAND.
HORSE EVENER.
APPLICATION FILED JULY 25, 1906.
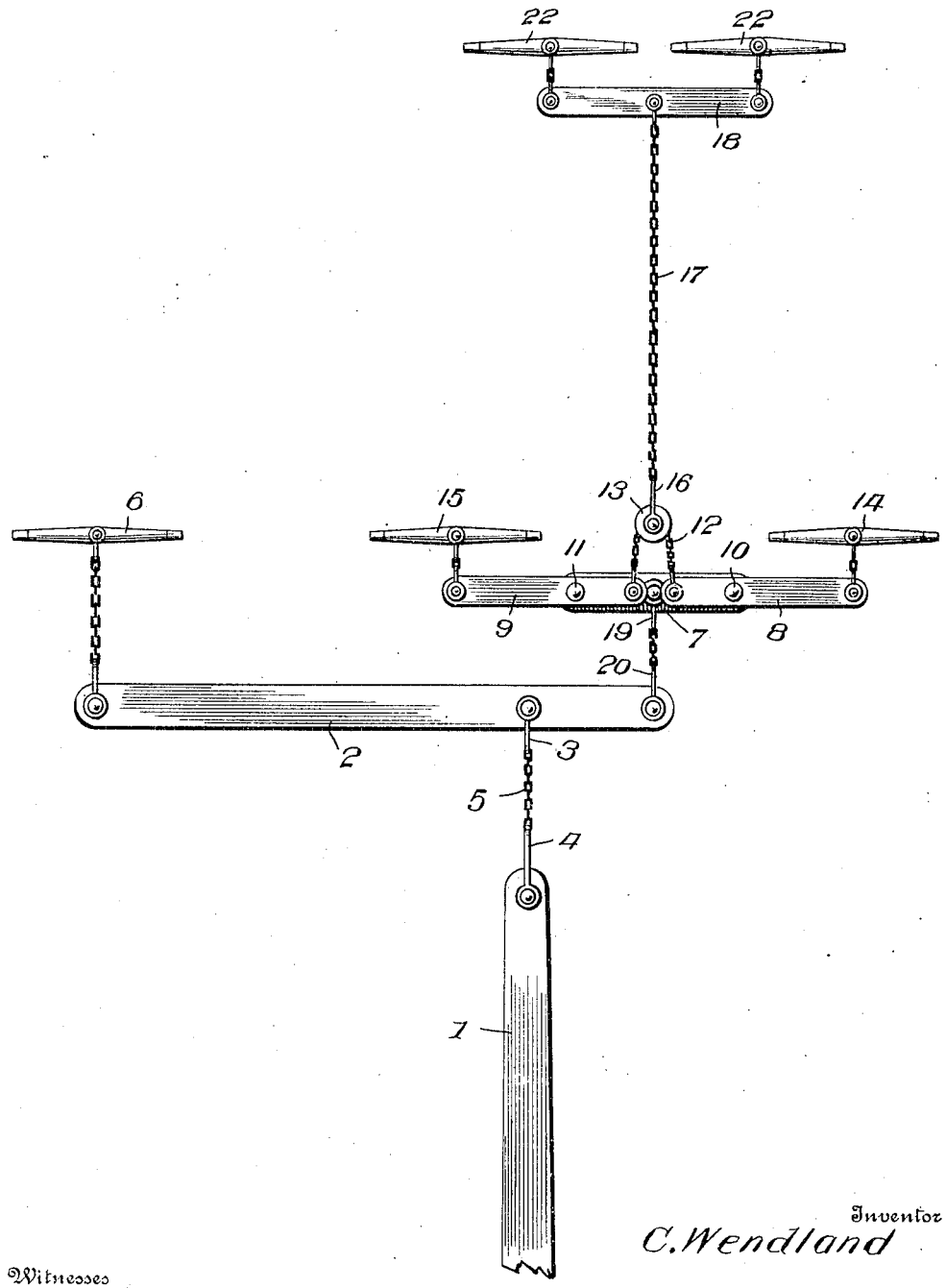
Witnesses
Inventor
C. Wendland
By W. J. Fitzgerald
Attorneys

UNITED STATES PATENT OFFICE.

CARL WENDLAND, OF KRUM, TEXAS.

HORSE-EVENER.

No. 843,246.　　　　　Specification of Letters Patent.　　　　　Patented Feb. 5, 1907.

Application filed July 25, 1906. Serial No. 327,678.

*To all whom it may concern:*

Be it known that I, CARL WENDLAND, a citizen of the United States, residing at Krum, in the county of Denton and State of Texas, have invented certain new and useful Improvements in Horse-Eveners; and I do hereby declare the following to be a full, clear, and exact description of the invention, such as will enable others skilled in the art to which it appertains to make and use the same.

My invention relates to new and useful improvements in eveners; and my object is to provide a device of this class which can be utilized for employing either four or five draft-animals.

Other objects and advantages will be hereinafter referred to and more particularly pointed out in the claim.

In the drawing I have shown a plan view of the evener as applied to use upon the beam or tongue of an implement, the evener being shown as when five animals are to be used.

Referring to the drawing, in which similar reference-numerals designate corresponding parts through, 1 indicates a tongue or beam of an implement to the outer end of which is secured a spreader-bar 2, said bar having a clevis 3 near one end thereof, said clevis being secured to a similar clevis 4 on the end of the tongue 1 by means of a chain 5. Secured to the end of the spreader-bar 2 farthest from the clevis 3 is a swingletree 6, while to the opposite end of the bar 2 is secured a doubletree 7, to each end of which is pivotally secured levers 8 and 9, respectively, the pivot-points 10 and 11, respectively of the levers being near their inner ends, said ends being yieldingly secured together by means of a chain 12, extending around a sheave 13, while the outer ends of said levers are provided with swingletrees 14 and 15, respectively. The sheave 13 is pivotally mounted in a clevis 16, to which is secured a chain 17, said chain being of sufficient length to extend in front of the draft-animals secured to the swingletrees 14 and 15 and has secured to its outer end a doubletree 18, the chain 17 being secured to the doubletree 18 at its central portion and extending in line with the connection between the doubletree 7 and the end of the spreader-bar 2, the doubletree 7 being secured to the bar 2 by means of clevises 19 and 20, respectively, and a chain 21 connecting said clevises, the clevis 19 being pivotally secured to the central portion of the doubletree 7, while the clevis 20 is pivotally secured to the short end of the spreader-bar 2. The doubletree 18 has secured to each end thereof a swingletree 22.

It will now readily be seen that by this construction five draft-animals can be used and by disposing a pair of draft-animals in front of the other pair of animals and both pairs of animals substantially in line with the tongue of the implement and a single horse to one side of the implement-tongue that the draft-animals will be assembled compactly together. It will also be seen that when it is desired to employ but four of the draft-animals that the spreader-bar 2 can be removed from the tongue and the clevis 20 secured to the tongue, thereby dispensing with the single animal and providing a four-horse evener, the draft-animal being then directly disposed in line with the tongue.

What I claim is—

A device of the class described comprising a spreader-bar, a swingletree secured to one end of said bar, means adjacent one end of said bar to secure said bar to a tongue, a doubletree secured to the opposite end of said spreader-bar from that occupied by the swingletree, levers pivotally secured to each end of said doubletree, the pivot-points of said levers being adjacent one end thereof, a swingletree secured to the outer end of each of said levers, a chain disposed between the meeting ends of said levers, a sheave engaging said chain, an elongated chain secured to said sheave, a doubletree at the outer end of said chain and a swingletree secured to each end of said doubletree, said chain being of sufficient length to dispose the draft-animals at the outer end thereof in front of the draft-animals secured to the swingletrees on the levers.

In testimony whereof I have signed my name to this specification in the presence of two subscribing witnesses.

CARL WENDLAND.

Witnesses:
W. G. KIMBROUGH,
PINES HARVEY.